(12) United States Patent
Perilla

(10) Patent No.: US 11,390,813 B2
(45) Date of Patent: Jul. 19, 2022

(54) DELAYED COKER CONTROLLED DISPERSION MODULE

(71) Applicant: AMEC FOSTER WHEELER USA CORPORATION, Houston, TX (US)

(72) Inventor: Miguel A. Perilla, Fulshear, TX (US)

(73) Assignee: AMEC FOSTER WHEELER USA CORPORATION, Houston, TX (US)

( * ) Notice: Subject to any disclaimer, the term of this patent is extended or adjusted under 35 U.S.C. 154(b) by 37 days.

(21) Appl. No.: 16/927,133

(22) Filed: Jul. 13, 2020

(65) Prior Publication Data

US 2021/0017451 A1 Jan. 21, 2021

Related U.S. Application Data

(60) Provisional application No. 62/876,472, filed on Jul. 19, 2019.

(51) Int. Cl.
*C10B 31/12* (2006.01)
*B01J 4/00* (2006.01)

(52) U.S. Cl.
CPC ............... *C10B 31/12* (2013.01); *B01J 4/005* (2013.01); *B01J 4/008* (2013.01)

(58) Field of Classification Search
CPC .. B01J 4/005; B01J 4/008; C10B 1/04; C10B 31/12
See application file for complete search history.

(56) References Cited

U.S. PATENT DOCUMENTS

| | | | |
|---|---|---|---|
| 4,042,353 A | 8/1977 | Warda et al. | |
| 4,295,773 A | 10/1981 | Dhondt | |
| 6,889,962 B2 * | 5/2005 | Laird | B01D 3/008 261/79.2 |
| 6,997,445 B2 * | 2/2006 | Vedrine | B01D 3/008 261/109 |
| 2004/0163305 A1 | 8/2004 | Lah | |
| 2005/0261530 A1 | 11/2005 | Stell et al. | |
| 2007/0108036 A1 | 5/2007 | Siskin et al. | |
| 2008/0179165 A1 | 7/2008 | Chen et al. | |
| 2011/0114468 A1 | 5/2011 | Davuluri et al. | |
| 2019/0161684 A1 | 5/2019 | McMillan et al. | |

* cited by examiner

*Primary Examiner* — Lessanework Seifu
(74) *Attorney, Agent, or Firm* — Winstead PC

(57) ABSTRACT

A controlled dispersion module includes a distal end coupled to an effluent feed. A proximal end having at least one baffle is disposed within the controlled dispersion module. The proximal end is fluidly coupled to the coke drum. In various embodiments, the proximal end is curved to match a curvature of the coke drum. In various embodiments, the at least one baffle includes a plurality of baffles.

11 Claims, 8 Drawing Sheets

DELAYED COKER CONTROLLED DISPERSION MODULE

CROSS-REFERENCE TO RELATED APPLICATIONS

This application claims priority to, and incorporates by reference, U.S. Provisional Patent Application No. 62/876,472, filed on Jul. 19, 2019.

TECHNICAL FIELD

The present application relates generally to delayed coker systems and more particularly, but not by way of limitation, to a dispersion module having a plurality of baffles disposed therein.

BACKGROUND

This section provides background information to facilitate a better understanding of the various aspects of the disclosure. It should be understood that the statements in this section of this document are to be read in this light, and not as admissions of prior art.

Refineries around the world continue search for ways to improve efficiency and yield. To accomplish this, an extensive use of residue conversion or so-called "bottom-of-the-barrel processing" is required. The delayed coking process includes rapidly heating a heater charge product above the coking point and delaying the formation of coke and separation of water and cracked oil until the heater charge product reaches a large vertical vessel called a coke drum. Coke drums normally operate between 15 psig and 75 psig. The heated product normally called "heater effluent" is in a "froth" liquid state when it enters the coke drum. When the heater effluent enters, the coke drum begins filling and the formation of coke commences almost immediately. In previous coke drums, heater effluent entered the coke drum through an inlet line coupled to a bottom surface of the coke drum. The effluent bottom inlet line to the coke drum, in many cases, included a distributor "hat" located inside the coke drum on a bottom surface thereof. The distributor allowed the dispersion of the heater effluent throughout the entire bottom section of the coke drum.

With the introduction of new coke-drum unheading devices, several valve arrangement designs were included as part of the regular equipment choices required for efficient and safe operation of delayed coker units. These technological changes have necessitated the relocation of the heater effluent inlet from the bottom of the coke drum to a side of the coke drum; creating as a result, many operational and design challenges. In order to address these challenges, several heater effluent injection methods including single entry (straight nozzle or angled upwards), dual inlet nozzles (straight nozzle or angled upwards), and center feed injection valves have been implemented in an attempt to resolve these challenges but so far none of them have been able to eliminate premature failure of the coke drums during "normal" coking operations.

SUMMARY

This summary is provided to introduce a selection of concepts that are further described below in the detailed description. This summary is not intended to identify key or essential features of the claimed subject matter, nor is it intended to be used as an aid in limiting the scope of claimed subject matter.

Aspects of the disclosure relate to a controlled dispersion module for use with a coke drum. The controlled dispersion module includes a distal end coupled to an effluent feed and a proximal end having at least one wedge disposed therein. The proximal end is fluidly coupled to the coke drum. The proximal end includes a flared profile relative to the distal end. The flared profile decreases a velocity of an effluent within the controlled dispersion module and facilitates vectoring of the effluent by the at least one wedge.

Aspects of the disclosure relate to a coke drum system. The coke drum system includes a coke drum having a skirt region and a neck region. A controlled dispersion module is coupled to the neck region. The controlled dispersion module includes a distal end coupled to an effluent feed and a proximal end having at least one wedge disposed therein. The proximal end is fluidly coupled to the coke drum.

Aspects of the disclosure relate to a method of operating a coke drum. The method includes piping heater effluent to a controlled dispersion module and reducing a velocity of the heater effluent within the controlled dispersion module. The heater effluent is introduced to the coke drum via the controlled dispersion module. The heater effluent is vectored to a periphery of the controlled dispersion module via at least one wedge disposed in the controlled dispersion module.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
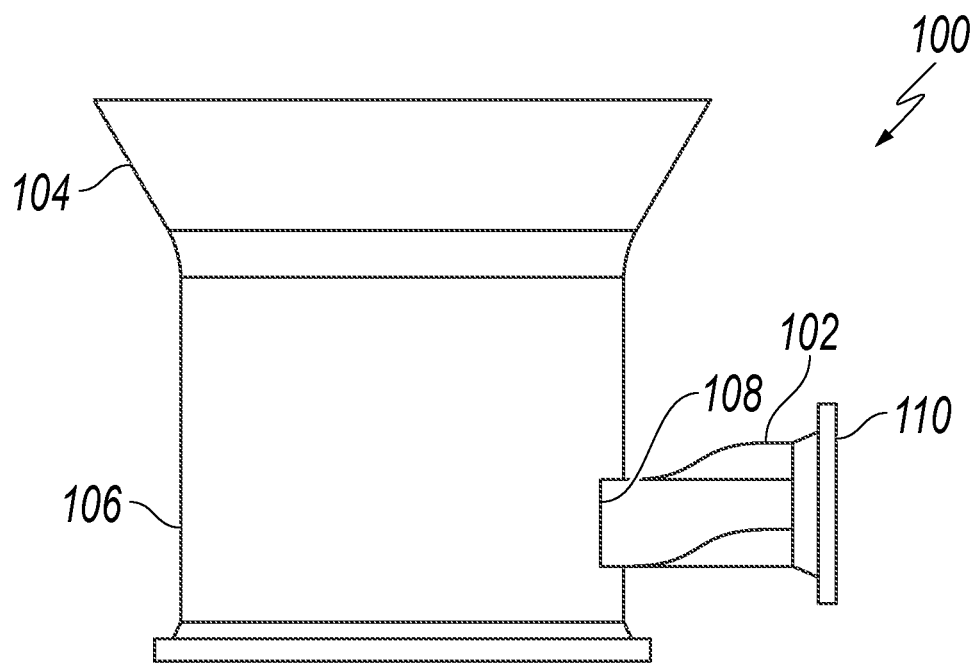
FIG. 1 is an elevation view of a bottom aspect of a coke drum having a controlled dispersion module coupled thereto in accordance with aspects of the disclosure.

FIG. 1 is an elevation view of a bottom aspect of a coke drum 100 having a controlled dispersion module 102 coupled thereto. The coke drum 100 includes a downwardly-angled skirt region 104 coupled to a neck region 106. In various embodiments, the coke drum 100 is constructed of, for example, mild steel or low-alloy clad materials including, for example, Carbon-1/2 Moly, 11/4 Chrome-1/2 Moly, 21/4 Chrome-1 Moly, SA387M, SA-182M, and SA-336M. The controlled dispersion module 102 includes a proximal end 108 that is fluidly coupled to a side of the neck region 106 above a bottom of the neck region 106. The controlled dispersion module 102 also includes a distal end 110 that is coupled to an effluent feed line (not shown). In various embodiments, the controlled dispersion module 102 is coupled to the neck region 106 via a joining process such as, for example, welding, brazing, or other similar joining process. In other embodiments, the controlled dispersion module 102 is separably coupled to the neck region 106 via, for example, bolts, rivets, or other appropriate joining mechanism. In various embodiments, the controlled dispersion module 102 is constructed of a material having a similar chemical composition and yield strength to that of the coke drum 100. Such similarity of materials helps to maintain the integrity of the coke drum 100 and facilitates maintaining a seal between the coke drum 100 and the controlled dispersion module 102. In various embodiments, the controlled dispersion module 102 has a length of, for example, approximately three feet; however, in other embodiments, other lengths could be utilized.

Figure 2:
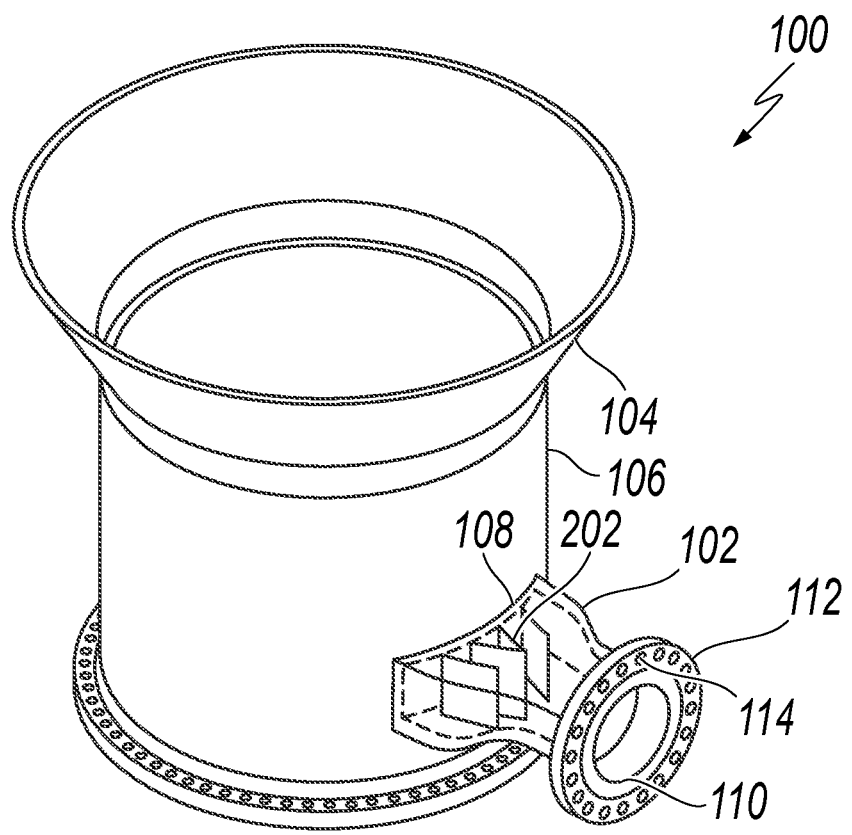
FIG. 2 is a perspective view of the coke drum and the controlled dispersion module of FIG. 1.

FIG. 2 is a perspective view of the coke drum 100 and the controlled dispersion module 102. At least one wedge 202 is disposed within the controlled dispersion module 102 at the proximal end 108. In various embodiments, the at least one wedge 202 imparts a directional vector to the heater effluent passing through the controlled dispersion module 102. In various embodiments, the at least one wedge 202 directs the entering heater effluent to a periphery of the neck region 106 of the coke drum 100. In various embodiments, the at least one wedge 202 includes a pair of oppositely-disposed baffles that contact each other at a distal end. In other embodiments, the distal ends of the baffles may not contact each other. In various embodiments, the oppositely-disposed baffles that make up the at least one wedge 202 have a length of, for example, approximately twelve inches and a thickness of, for example, approximately ¾ inch; however, in other embodiments, the oppositely-disposed baffles may have different dimensions and may be, for example, longer, shorter, wider, or narrower, as dictated by particular applications. The distal end 110 of the controlled dispersion module 102 includes a flange 112 to facilitate connection of the controlled dispersion module 102 with, for example, an effluent feed line (not shown). By way of example, the flange 112 is illustrated in FIG. 2 as including a plurality of apertures 114 for receipt of, for example, bolts therethrough. In such embodiments, the flange 112 abuts a corresponding flange formed on the effluent feed line and the apertures 114 align in registry with corresponding apertures formed through the flange of the effluent feed line. Fasteners such as, for example, bolts are passed through the apertures 114 in order to secure the flange 112 to the effluent feed line. In various embodiments, however, the flange 112 could be omitted and the controlled dispersion module 102 could be joined to the effluent feed line via a process such as, for example, welding or brazing. In still other embodiments, the controlled dispersion module 102 could be integrally formed with the effluent feed line.

Figure 3:
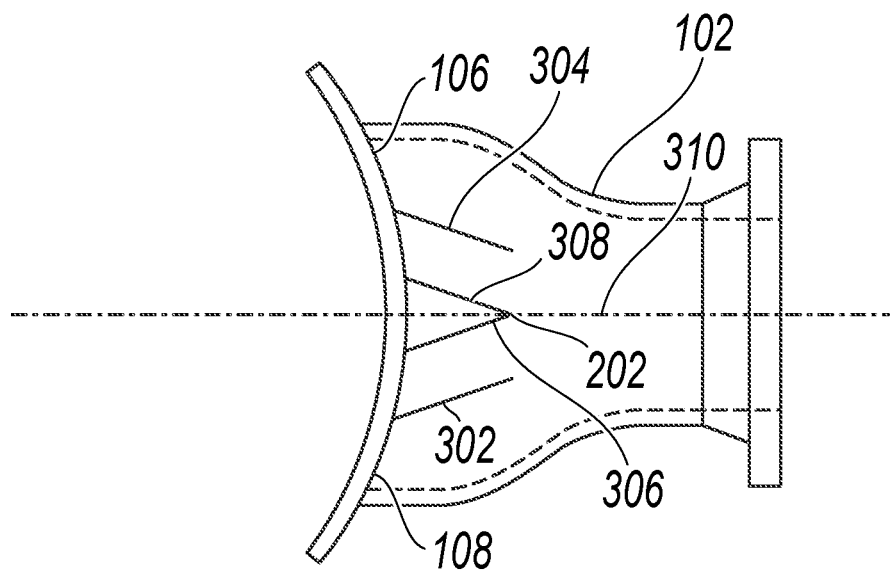
FIG. 3 is a top cross-sectional view of the controlled dispersion module of FIG. 1.

FIG. 3 is a top cross-sectional view of the controlled dispersion module 102. The controlled dispersion module 102 exhibits a flared profile such that a cross-sectional area of the controlled dispersion module 102 increases from the distal end 110 to the proximal end 108. The flared profile could be of any shape such as, for example, conical, trapezoidal, or any other appropriate geometry. During operation, the flared profile of the controlled dispersion module 102 causes a velocity of the heater effluent to decrease as the heater effluent passes through the controlled dispersion module 102. Such a decrease in the velocity of the heater effluent passing through the controlled dispersion module 102 allows the heater effluent to be vectored by the at least one wedge 202 prior to entering the coke drum 100. In the embodiment illustrated in FIG. 3, the at least one wedge 202 includes a first outboard baffle 302 and a second outboard baffle 304 in addition to the wedge 202; however, in other embodiments, the at least one wedge 202 could include any number of baffles. In the embodiment illustrated in FIG. 3, the at least one wedge 202 is arranged about an approximate center line 310 of the controlled dispersion module 102 and angled towards a periphery of the controlled dispersion module 102. In various embodiments, the at least one wedge 202 is formed from a first inboard baffle 306 and a second inboard baffle 308. The distal tips of the first inboard baffle 306 and the second inboard baffle 308 contact each other, forming the at least one wedge 202, such that heater effluent passing through the controlled dispersion module 102 is directed away from the center of the controlled dispersion module 102. The first outboard baffle 302 and the second outboard baffle 304 are arranged outwardly of, and generally parallel to, the first inboard baffle 306 and the second inboard baffle 308, respectively; however, in other embodiments, the first outboard baffle 302 and the second outboard baffle 304 could be arranged with any angular orientation depending on, for example, a size of a coke drum 100, a density of the heater effluent, or other factors. Still referring to FIG. 3, the proximal end 108 of the controlled dispersion module 102 is curved to match a surface contour of the neck region 106 of the coke drum 100 and includes a lip having a minimum radius of, for example, one inch to facilitate reduction of stress in a region of the coke drum 100 near the controlled dispersion module 102. Curvature of the proximal end 108 facilitates sealing of the controlled dispersion module 102 to the neck region 106 of the coke drum 100.

Figure 4:
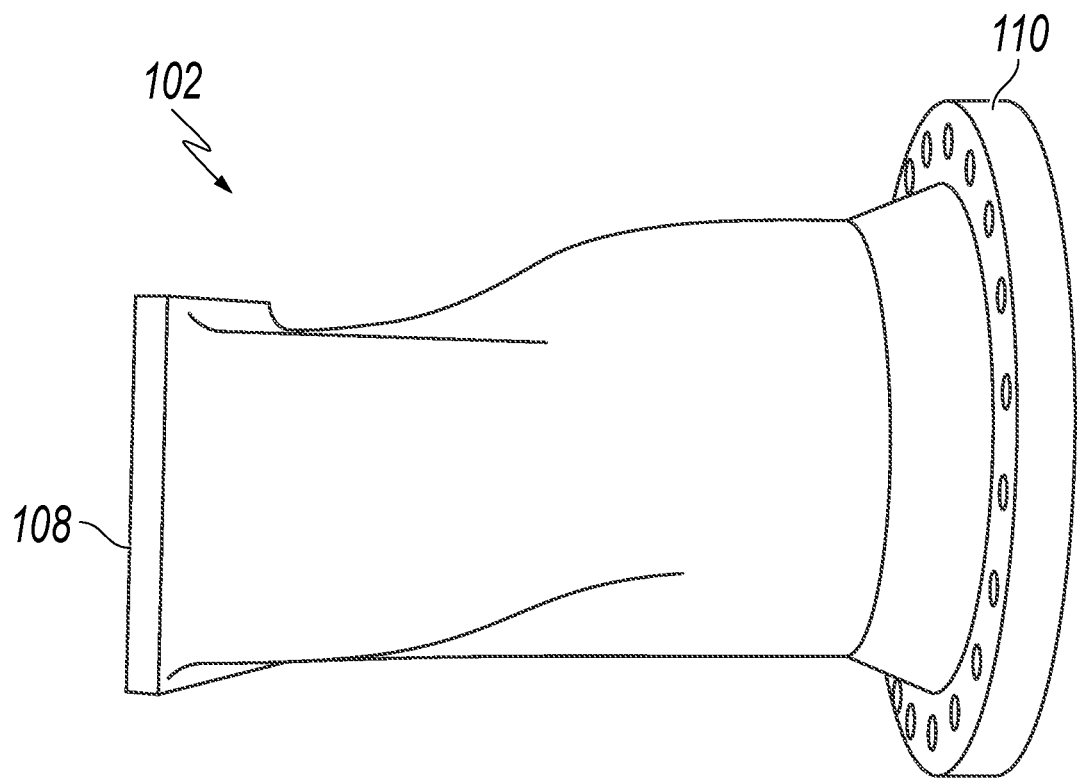
FIG. 4 is a side view of a controlled dispersion module in accordance with aspects of the disclosure.

FIG. 4 is a side view of the controlled dispersion module 102. The controlled dispersion module 102 exhibits a curved lateral profile such that the distal end 110 is higher in elevation than the proximal end 108. In various embodiments, the curved lateral profile enlarges a discharge area of the controlled dispersion module 102, reducing a velocity of the heater effluent moving through the controlled dispersion module 102. Such as reduction of velocity of the heater effluent facilitates vectoring the flow of the heater effluent towards a bottom of the coke drum 100.

Figure 5:
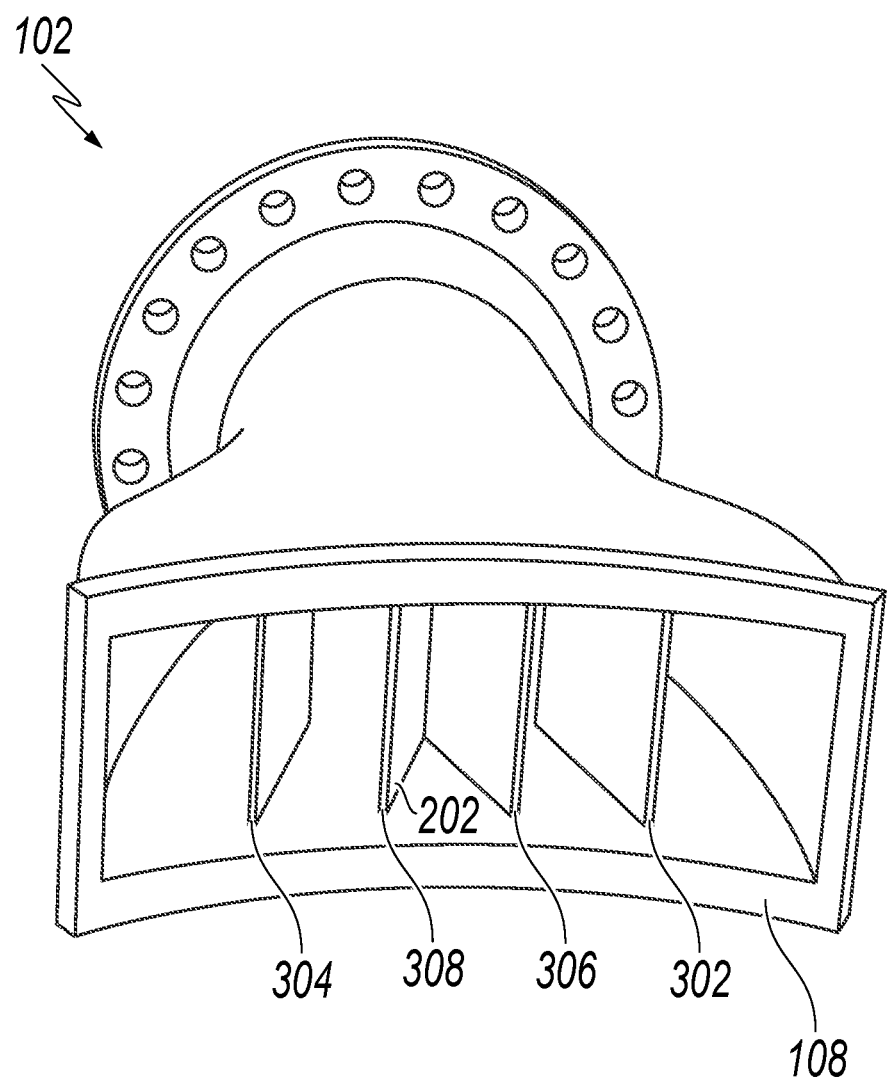
FIG. 5 is a proximal end view of the controlled dispersion module illustrating a coupling with a coke drum in accordance with aspects of the disclosure.
Figure 6:
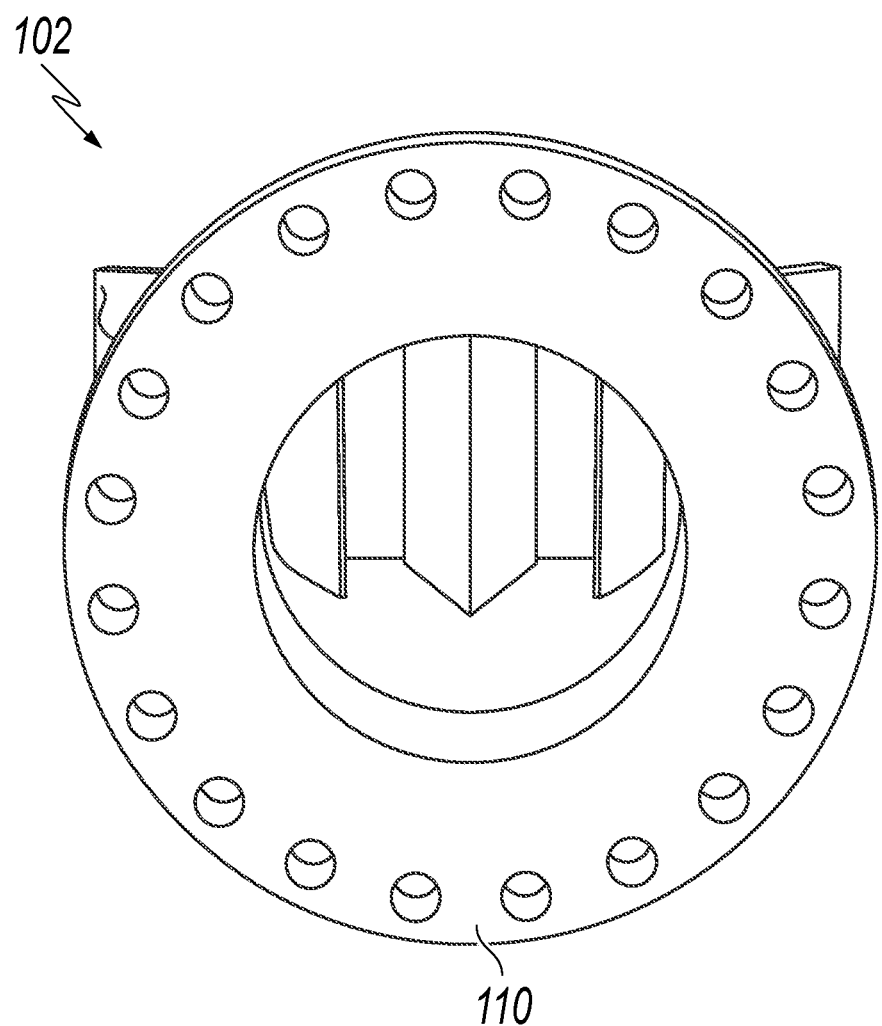
FIG. 6 is a distal end view of the controlled dispersion module illustrating a coupling with an effluent feed in accordance with aspects of the disclosure.

FIG. 5 is a proximal end view of the controlled dispersion module 102. FIG. 6 is a distal end view of the controlled dispersion module 102. Referring to FIGS. 5-6 collectively, the first outboard baffle 302, the second outboard baffle 304, and the at least one wedge 202 are disposed in the proximal end 108. As shown in FIGS. 5-6, the at least one wedge 202 is arranged about an approximate center line of the controlled dispersion module 102 and angled towards a periphery of the controlled dispersion module 102. In various embodiments, the at least one wedge 202 is formed from the first inboard baffle 306 and the second inboard baffle 308. The distal tips of the first inboard baffle 306 and the second inboard baffle 308 contact each other such that the heater effluent passing through the controlled dispersion module 102 is directed away from the center of the controlled dispersion module 102. The first outboard baffle 302 and the second outboard baffle 304 are arranged outwardly of, and generally parallel to, the first inboard baffle 306 and the second inboard baffle 308, respectively; however, in other embodiments, the first outboard baffle 302 and the second outboard baffle 304 could be arranged with any angular orientation depending on, for example, a size of a coke drum 100, a density of the heater effluent, or other factors. Still referring to FIGS. 5-6, the proximal end 108 of the controlled dispersion module 102 is curved to match a surface contour of the neck region 106 of the coke drum 100 and includes a lip having a minimum radius of, for example, one inch to facilitate reduction of stress in a region of the coke drum 100 near the controlled dispersion module 102. Curvature of the proximal end 108 facilitates sealing of the controlled dispersion module 102 to the neck region 106 of the coke drum 100.

Figure 7:
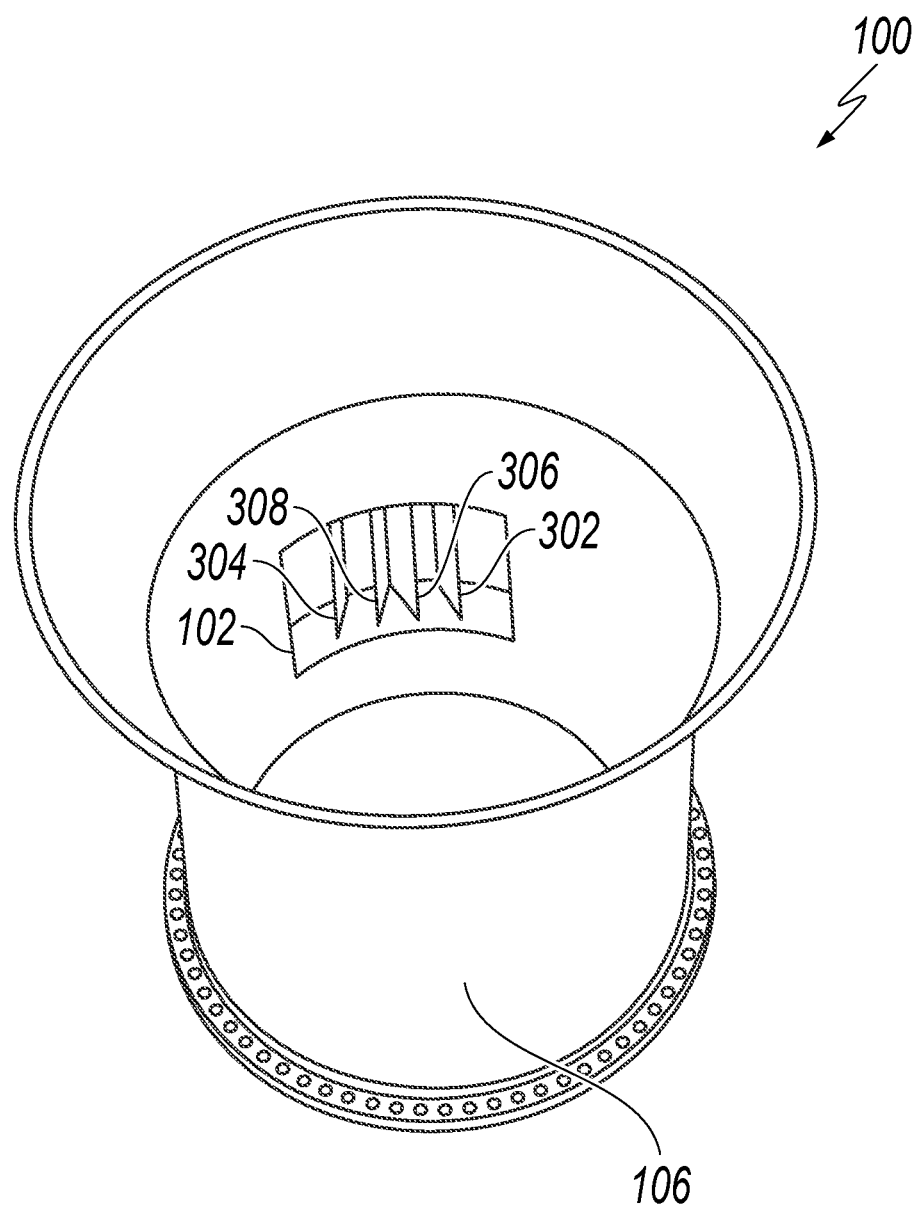
FIG. 7 is an interior view of a bottom aspect of the coke drum showing the controlled dispersion module in accordance with aspects of the disclosure.

FIG. 7 is an interior view of a bottom aspect of the coke drum 100 showing the controlled dispersion module 102. The proximal end 108 of the controlled dispersion module 102 is coupled to a side of the neck region 106. In various embodiments, the at least one wedge 202, the first outboard baffle 302, and the second outboard baffle 304 direct the heater effluent from the proximal end 108 of the controlled dispersion module 102 towards a periphery of the neck region 106.

Figure 8:
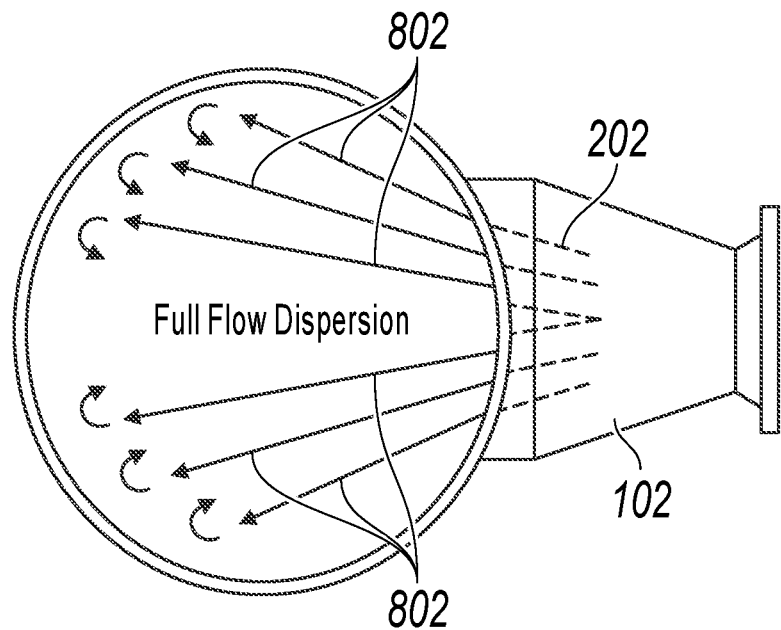
FIG. 8 is a top cross sectional view of the bottom aspect of the coke drum illustrating effluent flow therein.

FIG. 8 is a top cross sectional view of the bottom aspect of the coke drum 100 illustrating heater effluent flow. For purposes of illustration, heater effluent flow is illustrated in FIG. 8 by arrows 802. In various embodiments, the at least one wedge 202 of the controlled dispersion module 102 directs the heater effluent flow 802 towards a periphery of the coke drum 100. Such dispersion directs the heater effluent flow 802 over a substantial portion of the cross-sectional area of the coke drum 100 and avoids dispersion of the effluent in, for example an upwardly-directed single stream or a stream directed to a point on an opposite side of the coke drum 100 from the controlled dispersion module 102.

Still referring to FIG. 8, the controlled dispersion module 102 provides velocity-controlled discharge of heater effluent and flow dispersion in multiple directions across the bottom of the coke drum 100 and eliminates a stream-flow pattern and impingement directed at the wall of the coke drum 100 opposite the controlled dispersion module 102. Additionally, the controlled dispersion module 102 creates uniform temperature profile along the circumference of the coke drum 100. Such uniform temperature profile is achieved by allowing vapors to disengage from the liquid bed in a larger area. Such uniform distribution, in various embodiments, facilitates uniform thermal expansion of the coke drum 100 and reduces thermal stresses induced, for example, by uneven temperature profiles across the coke drum 100. Such uneven temperature profiles can lead to uneven thermal expansion of the coke drum 100, commonly referred to as the "Banana Effect." Further, the controlled dispersion module 102 creates a uniform vapor flow upwards over a larger area, thereby promoting flow patterns such as, for example, channeling through a center and outer area of the coke drum 100. Such flow patterns facilitate flow of, for example, hot oil feed, steam, and quench water upwards through an entire coke bed.

Figure 9:
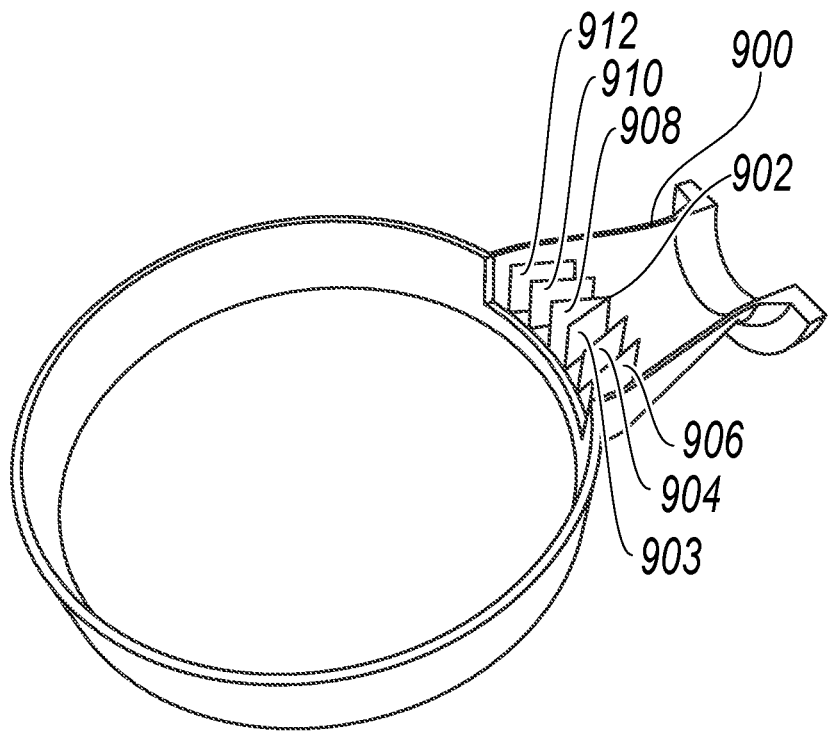
FIG. 9 is a cross sectional perspective view of the bottom aspect of the coke drum.

FIG. 9 is a cross sectional perspective view of the bottom aspect of the coke drum 100. The coke drum 100 has coupled thereto a controlled dispersion module 900. The controlled dispersion module 900 is similar in design and operation to the controlled dispersion module 102; however, the controlled dispersion module 900 includes at least one wedge 902, a first middle baffle 904, a first outboard baffle 906, a second middle baffle 910, and a second outboard baffle 912. The at least one wedge 902 is arranged about a center line of the controlled dispersion module 900 and is angled such that the heater effluent passing from the distal end 110 to the proximal end 108 is directed outwardly by the at least one wedge 902. In various embodiments, the at least one wedge 902 includes a first inboard baffle 903 and a second inboard baffle 908. The first inboard baffle 903 and the second inboard baffle 908 contact each other at their respective distal ends to form the at least one wedge 902. The first outboard baffle 906 and the second outboard baffle 912 are positioned outwardly of the at least one wedge 902. In various embodiments, the first outboard baffle 906 and the second outboard baffle 912 are arranged, for example, substantially parallel to the first inboard baffle 903 and the second inboard baffle 908, respectively; however, in other embodiments, the first outboard baffle 906 and the second outboard baffle 912 could be arranged with any angular orientation depending on, for example, a size of a coke drum 100, a density of the heater effluent, or other factors. The first middle baffle 904 is positioned between the first inboard baffle 903 and the first outboard baffle 906 and the second middle baffle 910 is positioned between the second inboard baffle 908 and the second outboard baffle 912, respectively. In various embodiments, the first middle baffle 904 and the second middle baffle 910 are oriented substantially parallel to the first inboard baffle 903 and the second inboard baffle 908, respectively; however, in other embodiments, the first middle baffle 904 and the second middle baffle 910 may be arranged with any orientation relative to the first inboard baffle 903, the first outboard baffle 906, the second inboard baffle 908, and the second outboard baffle 912, respectively, depending on, for example, a size of a coke drum 100, a viscosity of the heater effluent, or other factors.

Figure 10:
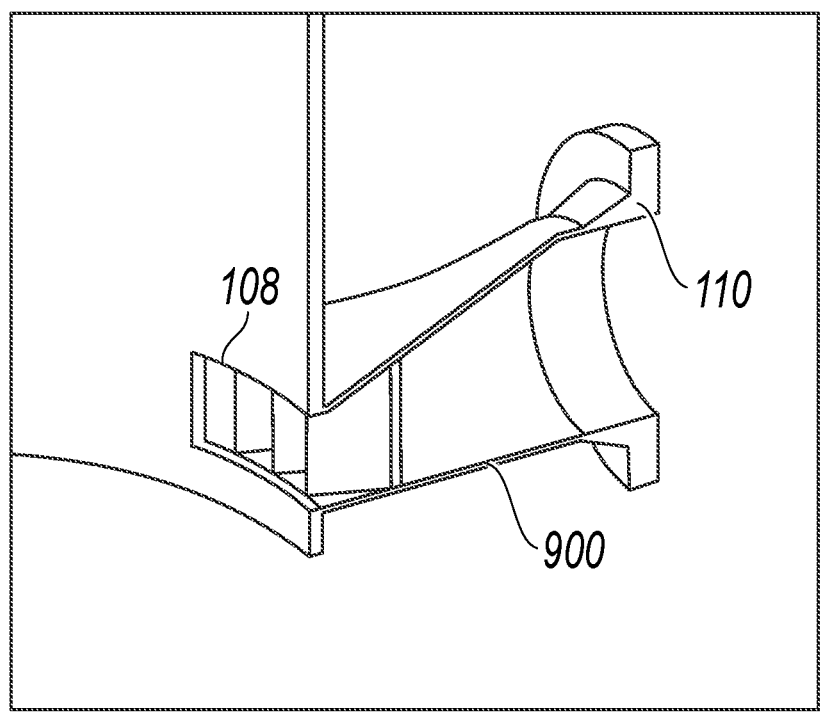
FIG. 10 is a side cross sectional view of the controlled dispersion module at an interface with the bottom aspect to the coke drum in accordance with aspects of the disclosure.

FIG. 10 is a side cross-sectional view of the controlled dispersion module 900 at an interface with the bottom aspect to the coke drum 100. The cross-sectional shape of the controlled dispersion module 900 changes between the proximal end 108 and the distal end 110 thereof. The cross-sectional area of the controlled dispersion module 900 facilitates velocity control of the heater effluent as the heater effluent moves from the distal end 110 to the proximal end 108 of the controlled dispersion module 900.

Figure 11:
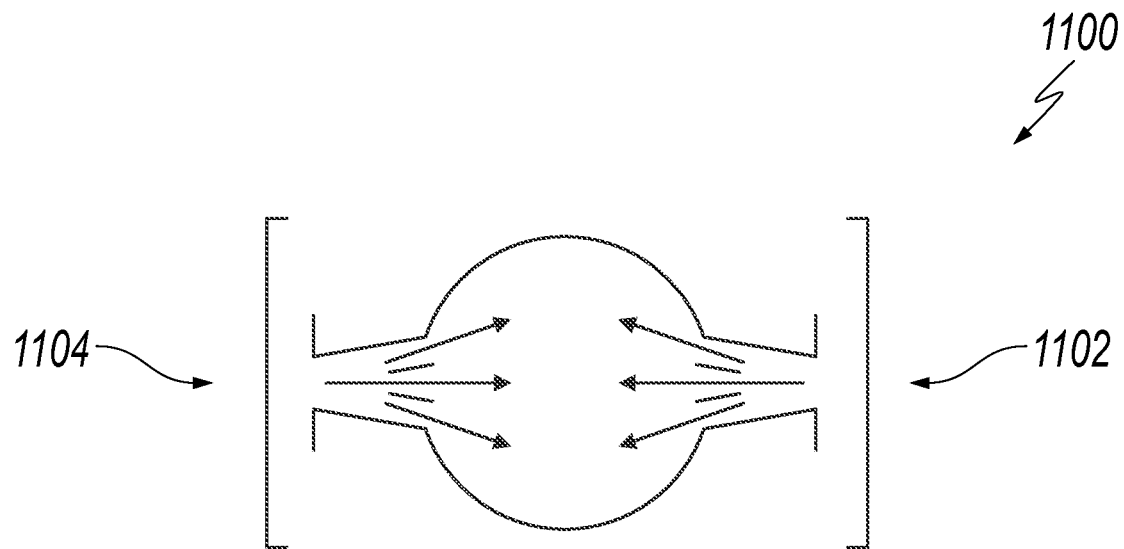
FIG. 11 is a top cross sectional view of a bottom aspect of the coke drum showing dual controlled dispersion modules coupled thereto in accordance with aspects of the disclosure.

FIG. 11 is a top cross-sectional view of a bottom aspect of a coke drum 1100 showing dual controlled dispersion modules coupled thereto. The coke drum 1100 includes a first controlled dispersion module 1102 and a second controlled dispersion module 1104 positioned approximately 180 degrees from each other on the periphery of the coke drum 1100. In various embodiments, the first controlled dispersion module 1102 and the second controlled dispersion module 1104 are similar in construction and operation to embodiments disclosed herein such as, for example, the controlled dispersion module 102 and the controlled dispersion module 900. In various embodiments, the coke drum 1100 may include any number of controlled dispersion modules. Further, the controlled dispersion modules may be positioned symmetrically or asymmetrically at any point on the periphery of the coke drum 1100 in an effort to achieve desired effluent dispersion across the coke drum 1100.

The embodiments disclosed and illustrated herein are exemplary only and capable of numerous rearrangements and changes in shape or dimension without departing from the sprit and scope of the disclosure. For instance, the controlled dispersion module 102 has been described and illustrated herein as having a rectangular-shaped interface with the neck region 106; however, in other embodiments, the interface between the controlled dispersion module 102 and the neck region 106 could be any shape including, for example, circular, rectangular, wedge-shaped, triangular, trapezoidal, or any other appropriate geometry. Further, all dimensions disclosed herein are exemplary and may, in various embodiments, be increased or decreased as needed in order to accommodate particular applications of various embodiments of the principles disclosed herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The term "at least one of" is meant to cover combinations of the listed elements, components, features, and the like, as well as the listed elements, components, features, and the like individually. For example, the phrase "at least one of A and B" is meant to cover embodiments comprising only A, embodiments comprising only B, and embodiments comprising both A and B unless stated otherwise.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A controlled dispersion module for use with a coke drum, the controlled dispersion module comprising:
    a distal end coupled to an effluent feed;
    a proximal end having at least one wedge disposed therein, the proximal end being fluidly coupled to an exterior of the coke drum, the proximal end having a flared profile relative to the distal end; and
    wherein the flared profile decreases a velocity of an effluent within the controlled dispersion module and facilitates vectoring of the effluent by the at least one wedge.

2. The controlled dispersion module of claim 1, wherein the proximal end is curved to match a curvature of the coke drum.

3. The controlled dispersion module of claim 1, wherein the at least one wedge comprises a plurality of baffles.

4. The controlled dispersion module of claim 3, wherein the plurality of baffles comprise:
    a first inboard baffle;
    a first outboard baffle;
    a second inboard baffle; and
    a second outboard baffle.

5. The controlled dispersion module of claim 4, wherein the first inboard baffle and the second inboard baffle are arranged about a center line of the controlled dispersion module.

6. The controlled dispersion module of claim 5, wherein the first outboard baffle and the second outboard baffle are arranged generally parallel to the first inboard baffle and the second inboard baffle, respectively.

7. The controlled dispersion module of claim 5, wherein the first inboard baffle, the second inboard baffle, the first outboard baffle, and the second outboard baffle direct effluent towards a periphery of the coke drum.

8. The controlled dispersion module of claim 1, wherein a cross-sectional area of the controlled dispersion module changes between the distal end and the proximal end.

9. The controlled dispersion module of claim 1, wherein the controlled dispersion module directs effluent flow towards a periphery of the coke drum.

10. The controlled dispersion module of claim 9, wherein the controlled dispersion module directs effluent over a cross-sectional area of the coke drum.

11. The controlled dispersion module of claim 1, comprising a second controlled dispersion module coupled to a neck region of the coke drum opposite the controlled dispersion module.

\* \* \* \* \*